US008543057B2

(12) United States Patent
Shin

(10) Patent No.: US 8,543,057 B2
(45) Date of Patent: Sep. 24, 2013

(54) SYSTEM AND METHOD FOR CONTROLLING A MOBILE TERMINAL

(75) Inventor: Seung-Ah Shin, Seoul (KR)

(73) Assignee: Shhphone International, Inc., Bakersfield, CA (US)

(*) Notice: Subject to any disclaimer, the term of this patent is extended or adjusted under 35 U.S.C. 154(b) by 0 days.

(21) Appl. No.: 13/398,065

(22) Filed: Feb. 16, 2012

(65) Prior Publication Data
US 2012/0208460 A1  Aug. 16, 2012

(30) Foreign Application Priority Data
Feb. 16, 2011  (KR) .................. 10-2011-0013547

(51) Int. Cl.
H04B 5/00  (2006.01)
(52) U.S. Cl.
USPC ........................................ 455/41.1
(58) Field of Classification Search
USPC ........................................ 455/41.1
See application file for complete search history.

(56) References Cited

U.S. PATENT DOCUMENTS

| 5,481,592 | A | * | 1/1996 | Azer | 455/12.1 |
| 5,818,903 | A | * | 10/1998 | Han et al. | 379/1.01 |
| 5,884,148 | A | * | 3/1999 | Bilgic et al. | 455/74.1 |
| 7,664,236 | B2 | * | 2/2010 | Radziewicz et al. | 379/88.25 |
| 7,769,155 | B2 | * | 8/2010 | Radziewicz et al. | 379/207.16 |
| 7,920,689 | B2 | * | 4/2011 | Radziewicz et al. | 379/215.01 |
| 8,121,267 | B2 | * | 2/2012 | Radziewicz et al. | 379/88.25 |
| 2005/0030384 | A1 | * | 2/2005 | Lee et al. | 348/207.99 |
| 2006/0128381 | A1 | | 6/2006 | Kim et al. | |
| 2008/0207128 | A1 | * | 8/2008 | Mikko | 455/41.2 |
| 2008/0242271 | A1 | * | 10/2008 | Schmidt et al. | 455/414.1 |
| 2009/0023476 | A1 | * | 1/2009 | Saarisalo et al. | 455/561 |
| 2009/0075592 | A1 | * | 3/2009 | Nystrom et al. | 455/41.1 |
| 2009/0247077 | A1 | * | 10/2009 | Sklovsky et al. | 455/41.1 |
| 2009/0312000 | A1 | * | 12/2009 | Wakefield et al. | 455/418 |
| 2010/0190437 | A1 | * | 7/2010 | Buhot | 455/41.1 |
| 2010/0274672 | A1 | * | 10/2010 | Patel | 705/14.66 |
| 2011/0250839 | A1 | * | 10/2011 | Lee | 455/41.1 |
| 2012/0129450 | A1 | * | 5/2012 | Lee | 455/41.1 |

FOREIGN PATENT DOCUMENTS

| JP | 2000-083278 | 3/2000 |
| KR | 10-0394976 B1 | 8/2003 |
| KR | 10-0911032 B1 | 8/2009 |
| KR | 10-0923117 B1 | 10/2009 |
| KR | 10-2010-0006869 | 1/2010 |
| WO | WO 2006/111782 A1 | 10/2006 |

* cited by examiner

Primary Examiner — Andrew Wendell
Assistant Examiner — David Bilodeau
(74) Attorney, Agent, or Firm — NSIP Law

(57) ABSTRACT

A system and method for controlling a mobile terminal are provided. According to an aspect, there is provided a mobile terminal control system including a mobile terminal and an external terminal, the mobile terminal including a memory, a Near-Field Communication (NFC) controller, and a base-band chip for controlling individual components of the mobile terminal, the external terminal communicating with the NFC controller of the mobile terminal, wherein the base-band chip registers an Application Identifier (AID) of at least one application that operates in the mobile terminal, in the NFC controller, executes, if the NFC controller receives an instruction for selecting the registered AID from the external terminal and notifies the base-band chip of the fact that the AID has been selected, the application selected by the external terminal to thereby control a predetermined function of the mobile terminal according to conditions setting information received from the external terminal.

16 Claims, 6 Drawing Sheets

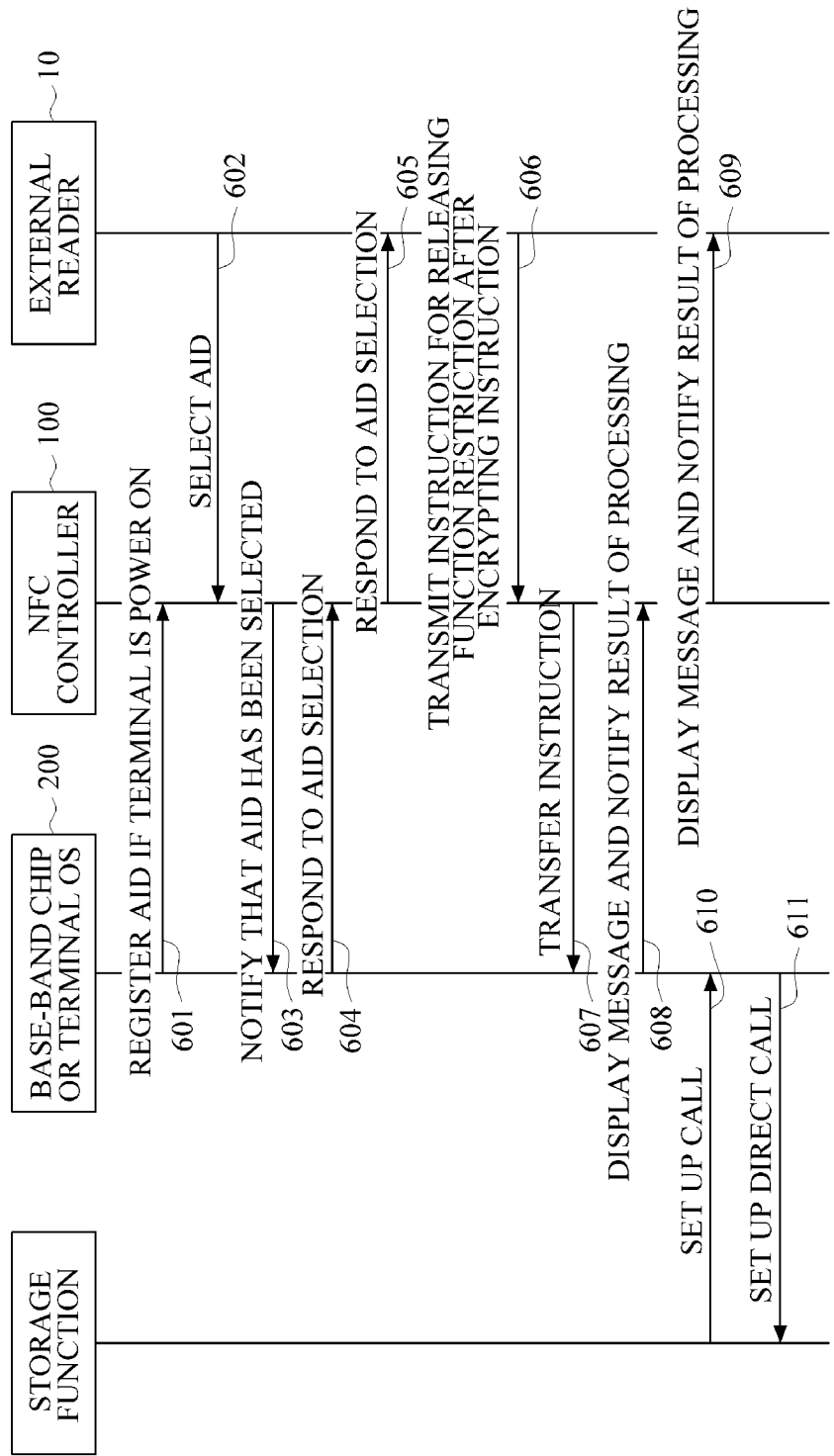

SYSTEM AND METHOD FOR CONTROLLING A MOBILE TERMINAL

CROSS-REFERENCE TO RELATED APPLICATION

This application claims the benefit under 35 U.S.C. §119 (a) of a Korean Patent Application No. 10-2011-0013547, filed on Feb. 16, 2011, the entire disclosure of which is incorporated herein by reference for all purposes.

FIELD

The following description relates to a technique for controlling a mobile terminal, and more particularly, to a system and method for controlling a mobile terminal, capable of automatically controlling a predetermined function, such as ring back tone setting or a memory access function, of the mobile terminal through communication with an external terminal placed at an entrance of a specific region, when a user of the mobile terminal enters the specific region at a specific time, without causing the user to manually set the function, wherein the mobile terminal control system and method can be applied in various ways depending on the requirement conditions of specific regions.

DESCRIPTION OF THE RELATED ART

Recently, a mobile terminal such as a mobile phone is being widely used as an essential item in modern day life. The mobile phone has been evaluated from a portable phone having only a voice call function to a multifunctional portable electronic device having a camera function, a multimedia play function of storing and replaying pictures, music, or video, a function of accessing a network such as the Internet to search for desired information and interacting with the network, etc.

Hence, users tend to possess their mobile phones anytime and anywhere even when they visit a specific region, such as an art center, a school, an institute, a national security facility, etc. However, in such a specific region, it is required to deactivate the bell sound function, call function, camera function, etc. of a mobile phone. Generally, when a user enters such a specific region, he or she should convert his or her mobile phone into a manner (vibration) mode or turn off the mobile phone. Such function restriction, function release, etc., which should be carried out manually by a user, was a big inconvenience to the user, and furthermore there often occurred the situation where a user forgets to turn off his or her mobile phone, etc. For these reasons, studies into a technique for automatically restricting a predetermined function(s) of a mobile phone when a user enters a specific region and resuming the restricted function(s) when he or she escapes from the specific region have been conducted.

As one result of such studies, Korean Patent Registration No. 10-0911032 discloses a technique for restricting the bell sound function, camera function, and communication function of a mobile terminal having a Near-Field Communication (NFC) chip module through is interactions between the mobile terminal and an external RF reader. The conventional technique relates to a method for automatically restricting the bell sound function, camera function, and communication function of a mobile terminal when a user of the mobile terminal puts the mobile phone on an external RF reader placed at an entrance of a specific region and automatically resuming the restricted functions when the user puts the mobile phone on another external RF reader placed at an exit of the specific region.

However, in the conventional technique, the external RF readers generate instructions for restricting the functions of a mobile phone or releasing the restricted functions, and a base-band chip which is in charge of controlling the entire operation of the mobile phone receives such an instruction and executes operation corresponding to the instruction. However, in the case where the operation of a base-band chip wholly depends on instructions from an external device, there is high possibility that important personal information stored in a mobile phone leaks out. Also, the conventional technique has a problem that other functions which a user wants to use can be disabled if function restriction is set up. For example, if a camera function of a mobile terminal is restricted, a user of the mobile terminal could not view any pictures, etc. previously stored in his or her mobile terminal.

As another conventional technique, Korean Patent Registration No. 10-0394976 discloses a function of providing predetermined ring back tone to a sender, wherein the ring back tone is a sound source designated by a mobile telecommunication company, by an advertiser, or by a subscriber. However, the conventional techniques still have limitation in meeting the purpose of limiting specific functions of a mobile phone at a specific region, such as an art center, a school, an institute, a national security facility, etc.

For these reasons, a technique for automatically controlling specific functions of a mobile terminal according to the requirement conditions of a specific region when a user of the is mobile phone enters the specific region while allowing him or her to use the other functions of the mobile phone is needed.

SUMMARY

The following description relates to a system and method for automatically controlling a predetermined function, such as ring back tone setting or a memory access function, of a mobile terminal according to the requirement conditions of a specific region through communication with an external terminal placed at an entrance of the specific region, when a user of the mobile terminal enters the specific region at a specific time, without causing the user to manually set the functions, wherein the mobile terminal control system and method can be applied in various ways depending on the requirement conditions of specific regions.

In one general aspect, there is provided a mobile terminal control system comprised of a mobile terminal and an external terminal, the mobile terminal including a memory, a Near-Field Communication (NFC) controller for NFC interface, and a base-band chip for controlling individual components of the mobile terminal, the external terminal communicating with the NFC controller of the mobile terminal, wherein the base-band chip registers an Application Identifier (AID) of at least one application that operates in the mobile terminal, in the NFC controller, and executes, if the NFC controller receives an instruction for selecting the registered AID from the external terminal and notifies the base-band chip of the fact that the AID has been selected, the application selected by the external terminal to thereby control a predetermined function of the mobile terminal according to conditions setting information received from the external terminal.

The at least one application deactivates only a function of writing new information in the is memory while activating the remaining functions of the mobile terminal.

The conditions setting information includes information for setting a kind of content that is prevented from being written in the memory.

The conditions setting information includes temporal information regarding a time at which function restriction of the mobile terminal is automatically released.

The conditions setting information is encrypted.

The AID of the at least one application is registered when the mobile terminal is power on.

The external terminal is placed at an entrance of the specific region.

The NFC controller communicates with the external terminal through RF-based contactless technology.

In another general aspect, there is provided a method of controlling a mobile terminal in a mobile terminal control system, the mobile terminal control system comprised of the mobile terminal and an external terminal, the mobile terminal including a memory, a Near-Field Communication (NFC) controller for NFC interface, and a base-band chip for controlling individual components of the mobile terminal, the external terminal communicating with the NFC controller of the mobile terminal, the method including: at the base-band chip, registering an Application Identifier (AID) of at least one application that operates in the mobile terminal, in the NFC controller; at the NFC controller, receiving an instruction for selecting the registered AID from the external terminal and notifying the base-band chip of the fact that the registered AID has been selected; and at the base-band chip, executing the application selected by the external terminal to thereby restrict a predetermined function of the mobile terminal or release a restricted function of the mobile terminal according to conditions setting information received is from the external terminal.

Accordingly, by automatically controlling a predetermined function, such as ring back tone setting or a memory access function, of a mobile terminal according to the requirement conditions of a specific region through communication with an external terminal placed at an entrance of the specific region, when a user of the mobile terminal enters the specific region at a specific time, the user does not need to manually set the function when he or she enters the specific region, and furthermore various control methods can be applied depending on the requirement conditions of specific regions.

Other features and aspects will be apparent from the following detailed description, the drawings, and the claims.

BRIEF DESCRIPTION OF THE DRAWINGS

FIG. 6 is a flowchart illustrating an example of a process for resuming a call function of a mobile terminal.

Figure 1:
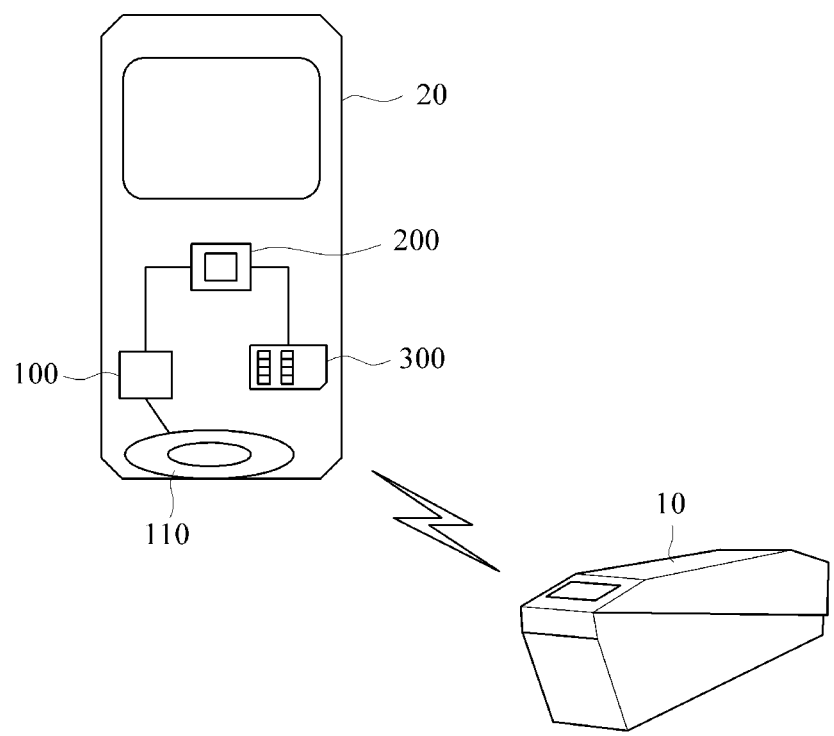
FIG. 1 illustrates an example of a mobile terminal control system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, examples of a system and method for controlling a mobile terminal will be described in detail with reference to drawings.

The mobile terminal control system is characterized by an ability to automatically disable a user to use a function of writing new information in a memory among functions of his or her mobile terminal while allowing him or her to use the other functions at an entrance of a specific region, such as an art center, a theater, a hospital, an institute, a military facility, etc. Or, the mobile terminal control system is characterized by an ability to restrict a call function of a mobile terminal and to automatically set ring back tone of the mobile terminal according to the requirement conditions of a specific region.

The characteristics of the mobile terminal control system can be achieved by controlling the functions of the mobile terminal through communication with an external terminal placed at an entrance of the specific region when a user of the mobile terminal enters the entrance of the specific region. The external terminal is managed by an operator of the corresponding specific region, not by the user, a mobile telecommunication company, or an advertiser. That is, the is functions of a mobile terminal may be set depending on the intention of an operator of a specific region, such as an art center, a theater, a hospital, an institute, or a military facility, such that the functions are automatically set according to the requirement conditions of the specific region when a user of the mobile terminal enters the specific region.

Referring to FIG. 1, the mobile terminal control system includes an external terminal 10 and a mobile terminal 20, wherein the external terminal 10 is placed at an entrance of a specific region and a mobile terminal 20 interacts with the external terminal 10.

The external terminal 10 has a Near-Field Communication (NFC) interface for interacting with the mobile terminal 20, and may further include an RF reader that transmits data in a wireless manner.

The mobile terminal 20 includes a memory 300, a NFC controller 100 for NFC interface, and a base-band chip 200 for controlling individual components of the mobile terminal 20. Here, the mobile terminal 20 may be a mobile phone or a smart phone, however, the mobile terminal 20 is not limited to these. That is, the mobile terminal 20 may be an arbitrary device including a memory, a NFC controller, and a controller.

Meanwhile, it has been well-known to those skilled in the art that a NFC controller interfaces communication between a USIM chip and a RF reader, wherein the USIM chip is generally installed in a mobile phone. In the current example, the NFC controller 100 is configured to interface communication between the external terminal 10 and the base-band chip 200 which functions as a main controller of the mobile terminal 10.

The base-band chip 200 may be a processor configuring a main controller of the mobile terminal 20. Here, the base-band chip 200 is in charge of the same role as that of a CPU of a personal computer, in the mobile terminal 20. For example, the base-band chip 200 executes, when the mobile terminal 20 is power on, OS of various applications that execute the functions is of the mobile terminal 20 to thereby set up an environment in which the user can use a specific application through the mobile terminal 20, and also the base-band chip 200 controls the individual components of the mobile terminal 20 in order for the mobile terminal 20 to execute the functions of the application.

The memory 300 may be an arbitrary storage that can be installed in or connected to the mobile terminal 20 through a USB port or the like.

In the mobile terminal control system, the base-band chip 200 is configured to control access operation for storing new information in the memory 300, to control a call function, and to register an application identifier (AID) of at least one application for receiving ring back tone from the external terminal 10 and setting the ring back tone, in a NFC controller 100. The registration operation may be performed when the mobile terminal 20 is power on. If an instruction for selecting the registered AID is received from the external terminal 10, the NFC controller 100 notifies the base-band chip 200 of the fact that the registered AID has been selected. Then, the base-band chip 200 executes the application selected by the external terminal 10. That is, the base-band chip 200 may restrict access operation of storing new information in the memory 300, control a call function, and also receive ring back tone from the external terminal 10 to set the ring back tone.

The NFC controller 100 may communicate with the external terminal 10 through RF-based contactless technology. That is, as illustrated in FIG. 1, an RF antenna 110 is installed in the mobile terminal 20, and the external terminal 10 may be an RF reader that continuously sends RF signals.

The base-band chip 200 may receive conditions setting information from the external terminal 10 in order to execute the application selected by the external terminal 10 and store new information in the memory 300, wherein the conditions setting information includes a condition is for restricting access to the memory 300 and/or temporal information regarding a time at which access restriction is automatically released.

Alternatively, the conditions setting information may be stored as a default value input by a user in the memory 300. In this case, the base-band chip 200 may execute the application according to the default value without having to receive any information from the external terminal 10. However, since specific regions where external terminals such as the external terminal 10 are placed generally will require different restriction conditions, it is more preferable that the conditions setting information is transmitted from the external terminal 10 to the mobile terminal 20.

The conditions setting information may include information for restricting storing of specific types of content (for example, images, text, and video) in the memory 300, information for controlling a call function, and information for setting a sound source that will be used as ring back tone.

Also, the conditions setting information may be encrypted for security before it is transmitted from the external terminal 10 to the base-band chip 200. At this time, the conditions setting information may be encrypted by a Secure Access Module (SAM) well-known as a security application module for smart card. That is, a SAM card may be installed in the external terminal 10, and another SAM card or a SAM software module may be installed in the base-band chip 200 or in OS that is executed by the base-band chip 200.

Figure 2:
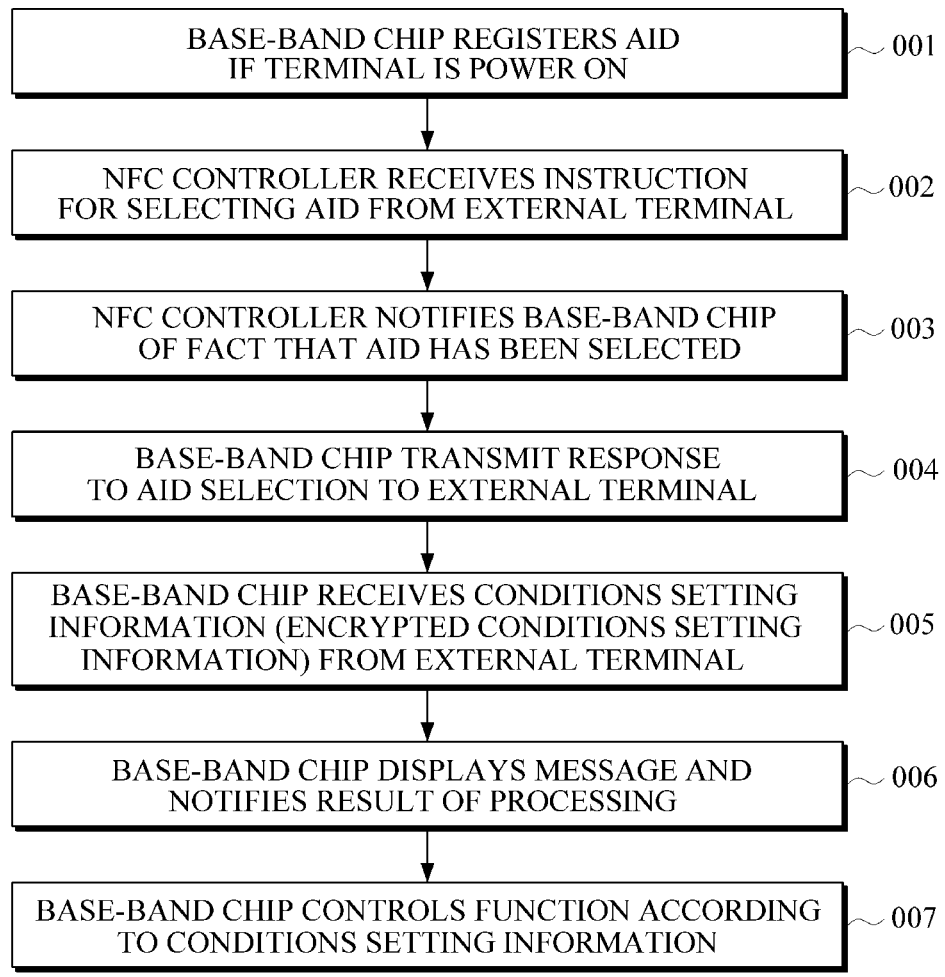
FIG. 2 is a flowchart illustrating an example of a mobile terminal control method.
Figure 3:
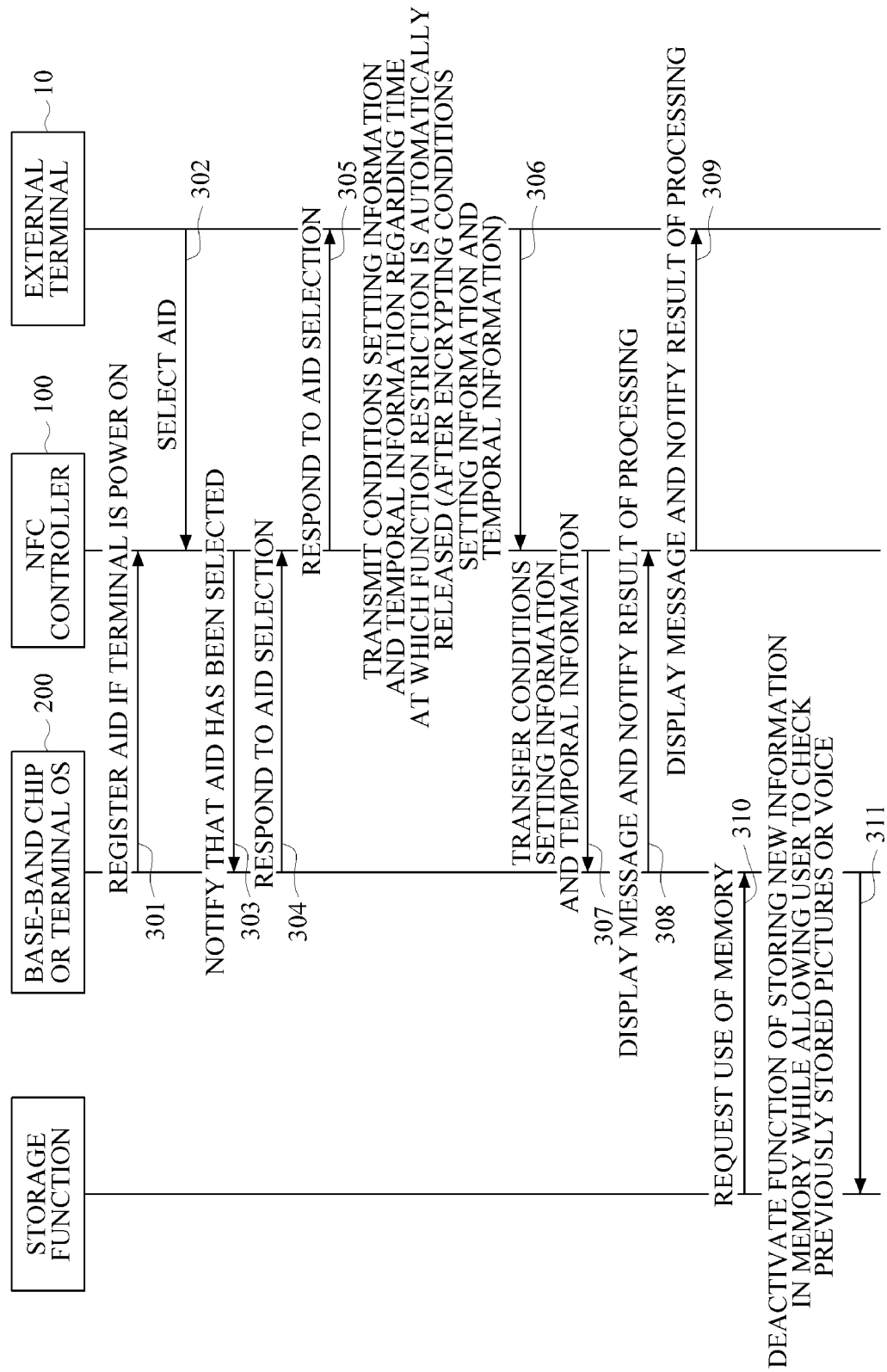
FIG. 3 is a flowchart illustrating an example of a process for restricting a storing function of a mobile terminal.
Figure 4:
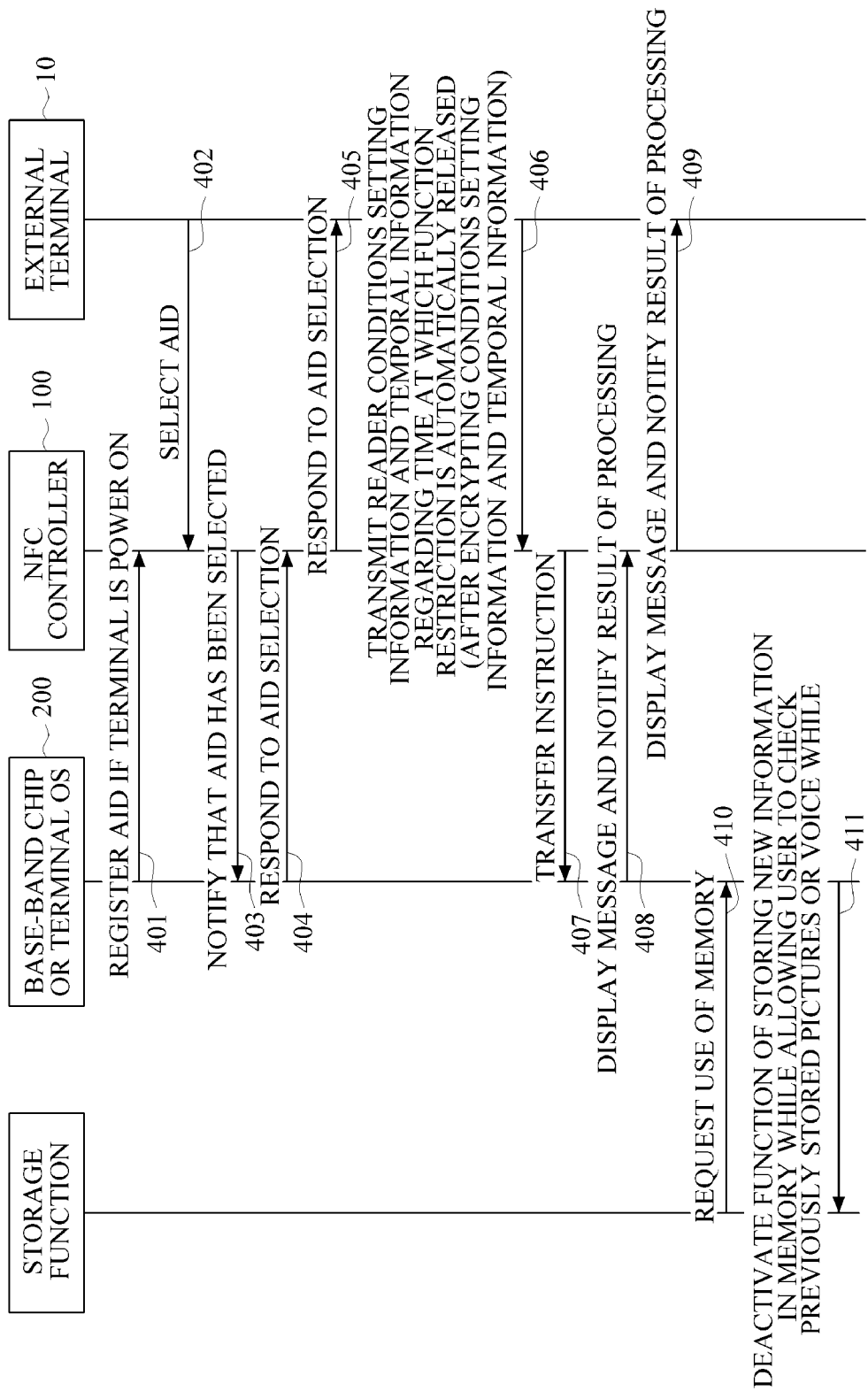
FIG. 4 is a flowchart illustrating an example of a process for resuming a storing function of a mobile terminal.

FIG. 2 is a flowchart illustrating an example of a mobile terminal control method, and FIGS. 3 and 4 are flowcharts illustrating examples of processes for controlling access to a memory in the mobile terminal control method.

Referring to FIGS. 1 through 4, when the mobile terminal 20 is power on, the base-band is chip 200 registers an AID of at least one application that controls access operation for storing new information in the memory 300, among applications that operate in the mobile terminal 20, in the NFC controller 100 (001 of FIG. 2, 301 of FIG. 3, 401 of FIG. 4).

Thereafter, when the user enters a specific region, the NFC controller 100 receives an instruction for selecting the registered AID from the external terminal 10 placed at an entrance of the specific region (002 of FIG. 2, 302 of FIG. 3, 402 of FIG. 4). Then, the NFC controller 100 notifies the base-band chip 200 of the fact that the registered AID has been selected (003 of FIG. 2, 303 of FIG. 3, 403 of FIG. 4).

Then, the base-band chip 200 transmits a response to the AID selection to the external terminal 10 through the NFC controller 100 (004 of FIG. 2, 304 and 305 of FIG. 3, 404 and 405 of FIG. 4).

Successively, the external terminal 10 transmits, when receiving the response from the base-band chip 200, conditions setting information to the base-band chip 200 through the NFC controller 100 after encrypting the conditions setting information, wherein the conditions setting information may include information for restricting a predetermined function(s) of the mobile terminal 20, temporal information regarding a time at which the restricted function(s) is automatically released, and/or information for releasing the restricted function(s) (005 of FIG. 2, 306 and 307 of FIG. 3, 406 and 407 of FIG. 4).

Then, the base-band chip 200 executes the application selected by the external terminal 10 to thereby restrict access operation for storing new information in the memory 300 or release a restricted function(s) (007 of FIG. 2, 310 and 311 of FIG. 3, 410 and 411 of FIG. 4). Then, the base-band chip 200 may display the result of the processing in the form of a message on a screen is of the mobile terminal 20 or notify the external terminal 10 of the result of the processing via the NFC controller 100 (006 of FIG. 6, 308 and 309 of FIG. 3, 408 and 409 of FIG. 4).

As described above, when a user enters a specific region, such as an art center, an institute, etc., it is convenient that he or she does not need to restrict or release a predetermined function(s) of his or her mobile terminal. Also, particularly, the user can view or check previously stored text messages or pictures although he or she cannot store new information in the memory 300.

Figure 5:
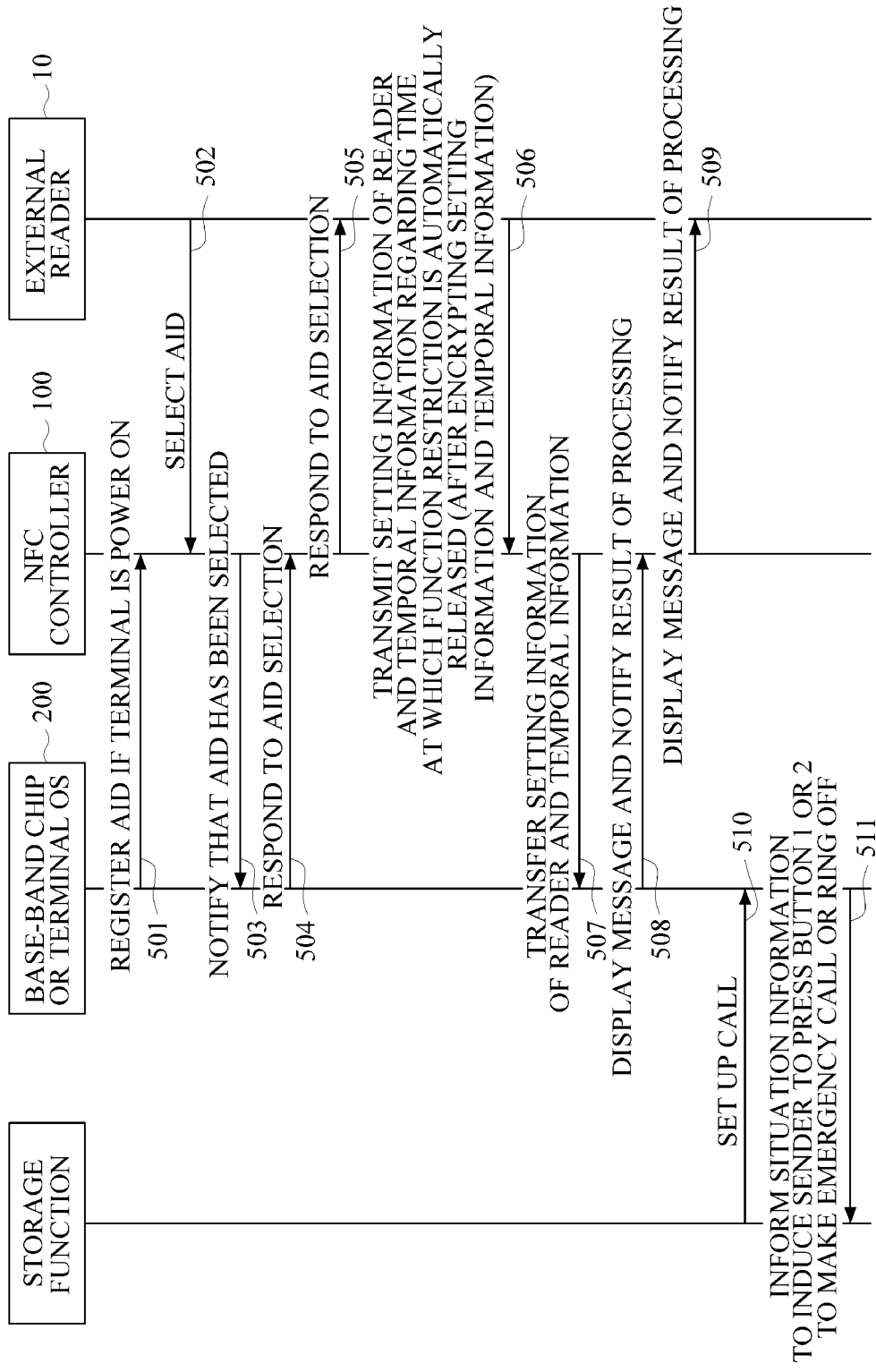
FIG. 5 is a flowchart illustrating an example of a process for restricting a call function of a mobile terminal and setting ring back tone of the mobile terminal.

FIGS. 5 and 6 are flowcharts illustrating examples of processes for restricting and resuming a call function of a mobile terminal in the mobile terminal control method illustrated in FIG. 2.

Referring to FIGS. 1, 2, 5, and 6, first, when the mobile terminal 20 is power on, the base-band chip 200 registers an AID of an application for restricting a call function of the mobile terminal 20 and automatically setting ring back tone according to a specific region, among applications that operate in the mobile terminal 20, in the NFC controller 100 (001 of FIG. 2, 501 of FIG. 5, 601 of FIG. 6).

Thereafter, when the user enters the specific region, the NFC controller 100 receives an instruction for selecting the registered AID from the external terminal 10 placed at an entrance of the specific region (002 of FIG. 2, 502 of FIG. 5, 602 of FIG. 6). Then, the NFC controller 100 notifies the base-band chip 200 of the fact that the registered AID has been selected (003 of FIG. 2, 503 of FIG. 5, 603 of FIG. 6).

Then, the base-band chip 200 transmits a response to the AID selection to the external terminal 10 through the NFC controller 100 (004 of FIG. 2, 504 and 505 of FIG. 5, 604 and 605 of FIG. 6).

The external terminal 10 transmits, when receiving the response from the base-band chip 200, conditions setting information to the base-band chip 200 via the NFC controller 100 after encrypting the conditions setting information, wherein the conditions setting information may include information for restring a predetermined function(s) of the mobile terminal 20 and temporal information regarding a time at which the restricted function(s) is automatically released and/or information for releasing the restricted function (005 of FIG. 2, 506 and 507 of FIG. 5, 606 and 607 of FIG. 6).

Thereafter, the base-band chip 200 executes the application selected by the external terminal 10 to thereby restrict a call function of the mobile terminal 20 and automatically set or release ring back tone according to the specific region based on a sound source or a sound source selection instruction received from the external terminal 10 (007 of FIG. 2, 510 and 511 of FIG. 5, 610 and 611 of FIG. 6). Then, the base-band chip 200 may display the result of the processing in the form of a message on a screen of the mobile terminal 20 or notify the external terminal 10 of the result of the processing via the NFC controller 100 (006 of FIG. 6, 508 and 509 of FIG. 5, 608 and 609 of FIG. 6).

At this time, if the application that has set the call function of the mobile terminal 20 according to the conditions setting information receives a call from a sender at a remote location, the application may prevent bell sound from being heard while providing the sender with ring back tone in the form of a voice message, for example, "Please press a button 1 if you wants to have an emergency call and press a button 2 if you wants to ring off because the customer cannot answer the phone for the reason of "situation setting"". Thereafter, if the sender presses the button 1, the application may enable bell sound to be heard in order to notify that an emergency call was made.

Therefore, as described above, by automatically restricting and releasing a call function of a mobile terminal at a specific region, such as an art center, an institute, according to the is requirement conditions of the specific region, a user himself or herself does not need to set a function(s) of his or her mobile terminal when he or she enters the specific region.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile terminal control system including a mobile terminal and an external terminal, the mobile terminal including a memory, a Near-Field Communication (NFC) controller for NFC interface, and a base-band chip for controlling individual components of the mobile terminal, the external terminal communicating with the NFC controller of the mobile terminal, wherein the base-band chip of the mobile terminal is configured to register an Application Identifier (AID) of at least one application which operates in the mobile terminal, in the NFC controller, and to execute an application, in response to the NFC controller receiving an instruction for selecting an AID of the application from the external terminal, to thereby control a predetermined function of the mobile terminal according to conditions setting information received from the external terminal, the conditions setting information comprising access control information for storing new information in the memory of the mobile terminal, information for controlling a call function of the mobile terminal, and setting information regarding a ring back tone that is heard by a sender when the call function of the mobile terminal is restricted, and in response to the mobile terminal receiving a call from a sender, the application selected by the external terminal prevents a bell sound from being played at the mobile terminal, provides the sender with a ring back tone, according to a specific region of the mobile terminal, indicating that the bell sound is being restricted at the mobile terminal, and provides the sender with an option to force the bell sound to be played at the mobile terminal.

2. The mobile terminal control system of claim 1, wherein the application deactivates a function of writing new information in the memory of the mobile terminal.

3. The mobile terminal control system of claim 1, wherein the conditions setting information includes information for setting a kind of content that is prevented from being written in the memory.

4. The mobile terminal control system of claim 1, wherein the conditions setting information includes temporal information regarding a time at which function restriction of the mobile terminal is automatically released.

5. The mobile terminal control system of claim 1, wherein the conditions setting information is encrypted.

6. The mobile terminal control system of claim 1, wherein the AID of the application is registered when the mobile terminal is powered on.

7. The mobile terminal control system of claim 1, wherein the external terminal is placed at an entrance of a specific region.

8. The mobile terminal control system of claim 1, wherein the NFC controller communicates with the external terminal through RF-based contactless technology.

9. A method of controlling a mobile terminal in a mobile terminal control system, the mobile terminal control system including the mobile terminal and an external terminal, the mobile terminal including a memory, a Near-Field Communication (NFC) controller for NFC interface, and a base-band chip for controlling individual components of the mobile terminal, the external terminal communicating with the NFC controller of the mobile terminal, the method comprising:

at the base-band chip, registering an Application Identifier (AID) of at least one application that operates in the mobile terminal, in the NFC controller;

at the NFC controller, receiving an instruction for selecting a registered AID from the external terminal and notifying the base-band chip that the AID has been selected; and at the base-band chip, executing an application corresponding to the AID selected by the external terminal to thereby restrict a predetermined function of the mobile terminal or release function restriction according to conditions setting information received from the external terminal, wherein the conditions setting information includes access control information for storing new information in the memory, information for controlling a call function, and setting information regarding ring back tone that is heard by a sender when the call function is restricted, and in response to the mobile terminal receiving a call from a sender, the application selected by the external terminal prevents a bell sound from being played at the mobile terminal, provides the sender with a ring back tone, according to a specific region of the mobile terminal, indicating that the bell sound is being restricted at the mobile terminal located at the specific region, and provides the sender with an option to force the bell sound to be played at the mobile terminal.

10. The method of claim 9, wherein the application deactivates a function of writing new information in the memory of the mobile terminal.

11. The method of claim 9, wherein the conditions setting information includes information for setting a kind of content that is prevented from being written in the memory.

12. The method of claim 9, wherein the conditions setting information includes temporal information regarding a time at which function restriction of the mobile terminal is automatically released.

13. The method of claim 9, wherein the conditions setting information is encrypted.

14. The method of claim 9, wherein the AID of the application is registered when the mobile terminal is powered on.

15. The method of claim 9, wherein the external terminal is placed at an entrance of a specific region.

16. The method of claim 9, wherein the NFC controller communicates with the external terminal through RF-based contactless technology.

\* \* \* \* \*